INVENTORS
E. BRUCE
W. A. REENSTRA
W. J. RITCHIE

BY
R. C. Winter
ATTORNEY

INVENTORS
E. BRUCE
W. A. REENSTRA
W. J. RITCHIE

BY
R. C. Winter
ATTORNEY

United States Patent Office 2,976,367
Patented Mar. 21, 1961

2,976,367
TWO-STAGE LINE CONCENTRATOR SYSTEM

Edmond Bruce, Fair Haven, Willard A. Reenstra, Rutherford, and Wesson J. Ritchie, Morris Plains, N.J., assignors to Bell Telephone Laboratories, Incorporated, New York, N.Y., a corporation of New York Filed Dec. 23, 1958, Ser. No. 782,419

26 Claims. (Cl. 179—18)

This invention relates to communication systems and more particularly to telephone systems wherein a plurality of telephone subscribers share a lesser plurality of trunks for connection to a central office.

In an effort to reduce the cost of the telephone plant, attempts have been made to concentrate remote subscriber lines in groups and connect them to a central office by a lesser number of trunks. One type of line concentrator serving this purpose is disclosed in E. Bruce and W. A. Reenstra Patent 2,724,746, issued November 22, 1955. This system comprises a single stage of line concentration in which a remote group of subscribers have access to a lesser group of trunks to a central office through a remote concentrator switching network. In this fashion, considerable economy is realized by the reduction in costly cable pairs extending between remote subscriber groups and a central office control point.

The single-stage concentrator disclosed in the aforementioned Bruce-Reenstra patent provides the optimum economies in trunking but is inherently inefficient from a traffic usage standpoint. This is apparent from the fact that such concentration limits a remote group of subscribers to the particular trunks interconnecting that subscriber group and the central office.

It is known that larger trunk groups increase traffic handling capacity. It is also evident that division of a large number of subscriber lines into distinct groups and connection of each distinct group through more than one concentration stage to a final group of trunks to the central office will facilitate improvement of the traffic situation and, as an end result, will further reduce the amount of wire required for trunk connections between the remote subscriber lines and central office over that required in the single-stage concentrator arrangement of the aforementioned patent.

It is therefore a general object of this invention to provide an improved communication system wherein a large number of lines may be connected to a central office by a small number of trunks with a concomitant saving in wire in the telephone plant.

It is another object of this invention to provide an improved communication system wherein traffic handling is facilitated by division of the large number of remote lines into small groups each having distinct connections to the common trunks.

More particularly it is an object of this invention to provide an improved telephone system wherein a number of subscriber lines may be connected by a plurality of first crosspoint switching networks to a lesser number of trunks which in turn are connected by at least one intermediate crosspoint switching network to a lesser number of trunks to the central office.

It is a further object of this invention to minimize connections required between the central office and remote concentrated telephone groups for the marking of the lines in each group.

It is still another object of this invention to provide for the instaneous identification at the central office of an individual line requesting service in a two-stage line concentrator system without additional trunks being required over those provided for voice transmission.

It is thus an object of this invention to minimize central office control by permitting line condition changes to initiate directly the connection of lines requesting service to the central office.

It is still a further object of this invention to provide means in a system including at least two remote concentrator stages for implementing simultaneous requests for service.

These and other objects of this invention are attained in one specific illustrative embodiment comprising a telephone system wherein connections between the central office and individual subscriber lines remote from the central office are established through more than one wire concentration stage, the stage connected to the subscriber lines being referred to as the primary concentrator stage and the stage connected to the central office being referred to as the secondary stage. From an economy standpoint, it is evident that accurate placement of the primary and secondary concentrator switching networks will minimize the length of cable required for the primary trunks, such that the secondary trunks to the central office will comprise substantially all of the major cable runs for the subscriber lines served.

In one specific illustrative embodiment of this invention, the direct-current line identification and control circuits are superimposed onto the talking path alternating-current circuits so that no additional trunks for control or line identification are required.

More particularly, in this specific illustrative embodiment, the trunk marking potentials, crosspoint holding current and subscriber loop current may be transmitted from the central office to each remote concentrator stage over one wire of selected trunks, and the line identification and marking signals may be transmitted to the concentrator control networks over the other wire of selected trunks.

In accordance with one aspect of our invention, the control or translator network in each primary concentrator comprises a plurality of diodes, varistors or other rectifying elements connected between certain lines and line identification wires from the secondary concentrator which, as mentioned above, are wires of the talking path trunks. These rectifying elements, referred to hereinafter as diodes, are connected in accordance with a code, the general equation of which is $$C = \frac{n(n-1)(n-2) \ldots (n-r+1)}{r!} \quad (1)$$

where $C$ is the total number of lines to be tested, $n$ the number of line identification wires being utilized and $r$ the number of those wires employed in any one identification operation. Each line is connected by diodes in the primary concentrator translators to $r$ different line identification wires and to a common control wire from the central office. Each corresponding line identification wire from each primary translator is connected by diodes in the secondary concentrator translator to common line identification leads. In addition, all line identification wires from each primary translator are connected by other diodes in the secondary translator in common to primary concentrator identification leads.

With respect to the line identification network for a specific system in accordance with our invention, each group of lines is connected through a corresponding primary translator to ten line identification wires, which wires are employed two at a time for a two-out-of-ten code basis. The secondary translator, in turn, connects the ten line identification wires from each primary translator to a corresponding concentrator identification lead, With twenty groups of telephones and thus twenty primary concentrators, twenty concentrator identification leads would extend from the secondary translator to the central office.

The secondary translator also connects corresponding line identification wires from each primary translator to common line identification leads; e.g., a first line identification wire from each primary translator is connected to a first common line identification lead to the central office. Thus with ten line identification wires corresponding to each group of subscriber lines, there are ten common line identification leads connected from the secondary translator to the central office. In addition, a common control wire extends from the primary translators to the central office, which wire, as noted hereinbefore, is connected to each of the lines at the corresponding primary translators. The combination of particular voltage and current conditions in these line and concentrator identification leads, control wire and subscriber lines serves to identify and mark a particular calling line.

While the above general description and the specific description below are of a telephone system, it is to be understood that our invention is equally applicable to other communication systems such as teletypewriter, telegraph, computer or other information dependent systems where it may be desirable to afford connection from a large number of lines or terminals to a remote central office or station over a smaller number of trunks and through a plurality of concentrator stages.

It is one feature of this invention that talking paths be completed through more than one concentrator switching stage linked between telephone subscriber lines and central office by corresponding distinct pluralities of trunks.

It is another feature of this invention that line identification and marking signals be transmitted to and from the central office through more than one concentrator control stage by a corresponding number of translators, each operable in accordance with a predetermined code.

More specifically, it is a feature of this invention that a control wire and a given number of line identification wires out of the total number in a first translator be utilized for the identification and marking of any particular calling line, that the calling line be connected over those line identification wires to a second translator, and that one concentrator identification lead and a plurality of line identification leads connected to said line identification wires at the second translator be utilized out of the total number of such leads connected between the second translator and the central office to mark only the particular line.

It is a further feature of this invention that a single control lead extend from the central office and be connected to each subscriber line through rectifying elements and permit procurement of subscriber line condition through a plurality of concentrator stages from signals initiated solely by the subscriber lines themselves.

It is a further feature of this invention that means be provided in the central office to permit program testing of the line identification leads at the central office to afford a selected priority to requests for service initiated simultaneously.

It is still a further feature of this invention that the primary and secondary concentrator translators be reversible so as to allow the passage of information in either direction through the plurality of concentrator stages dependent upon the terminating conditions. Thus it is a feature of this invention that the primary and secondary translators can convert coded information from the central office into line circuit controls and, conversely, convert line circuit changes into coded test information at the central office.

A complete understanding of this invention and of these and various other features thereof may be gained from consideration of the following detailed description and the accompanying drawing, in which:

Fig. 1 is a schematic representation in block diagram form of one specific illustrative embodiment of our invention comprising a telephone system;

Figs. 2-11, inclusive, illustrate the details of the system shown in Fig. 1;

Fig. 12 illustrates the arrangement of Figs. 2-11; and

Figure 1:
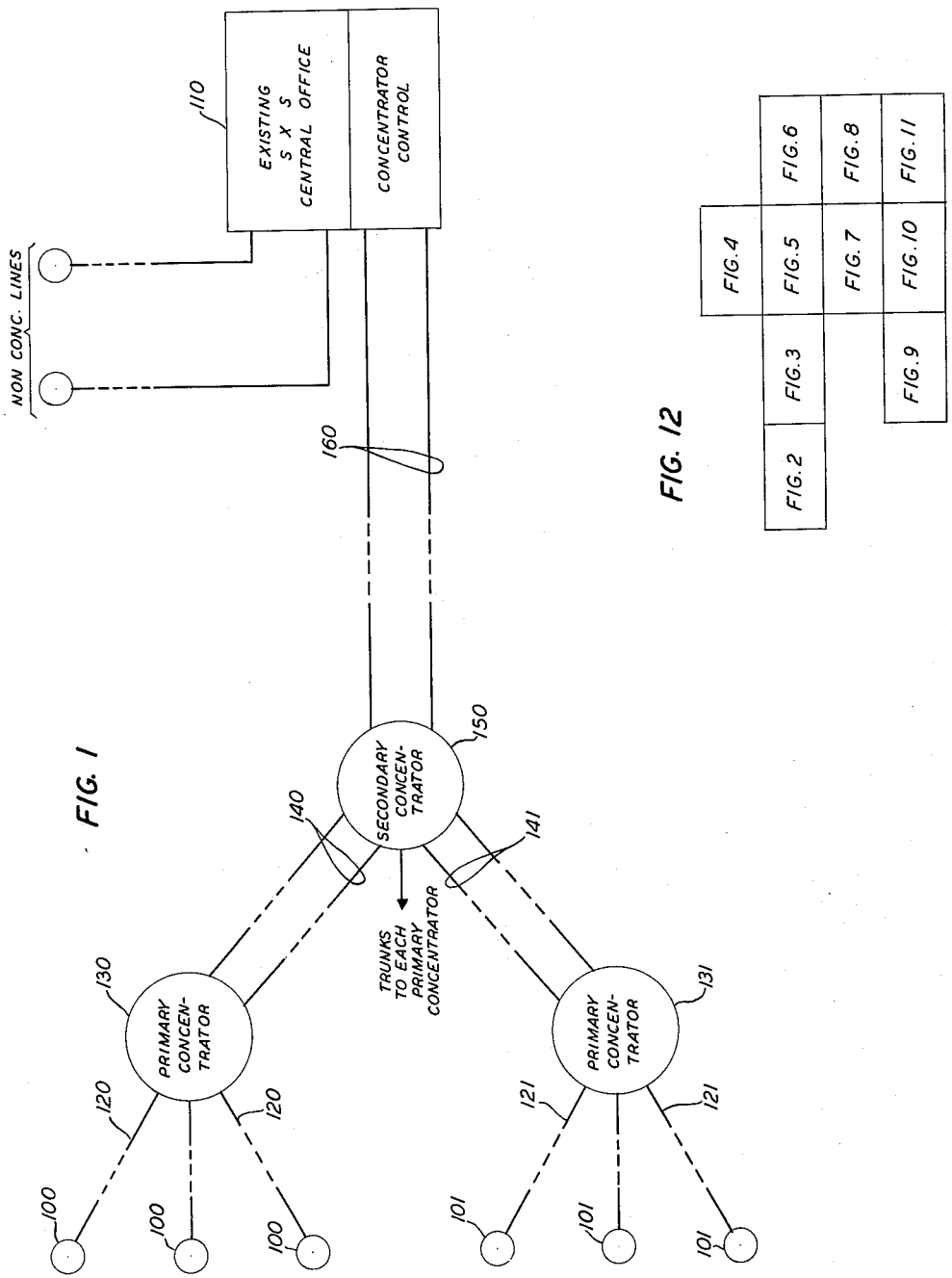

Turning now to the drawing, the specific illustrative embodiment of our invention shown in Fig. 1 comprises a telephone system in which a plurality of subscriber telephones such as 100 and 101 have access in distinct groups to a central office switching network 110 through individual subscriber lines 120 and 121, corresponding primary concentrators 130 and 131, primary trunks 140 and 141, a secondary concentrator 150 and secondary trunks 160. The number of primary trunks associated with each primary concentrator is less than the number of subscriber lines associated with the same primary concentrator. Similarly, the number of secondary trunks 160 is less than the total number of primary trunks associated with the secondary concentrator 150.

In this specific illustrative embodiment of the central office switching network 110 is of the step-by-step type, as known in the art, and is utilized to illustrate the adaptability of the remote concentrator system in accordance with our invention to such a central office facility, although the invention is not limited to such an application.

In general, the system operates so as to connect any one of the subscriber telephones originating a call, through the primary and secondary concentrator stages to the central office switching network, which in turn will complete the connection to the called subscriber whose telephone may be connected to the remote concentrator network, to the same office distinct from the remote concentrator network or to a foreign office. Similarly, on terminating calls; i.e., calls to subscribers in the remote concentrator network, the central office switching equipment is arranged to permit access to the desired subscriber telephone via the secondary and primary trunks. Facilities are also available in the central office to process simultaneous requests for service originating through the same primary concentrator or through a plurality of primary concentrators.

The three telephones associated with each primary concentrator in Fig. 1 are merely illustrative of the telephones which may comprise each concentrator unit. As described hereinbefore, such a system may comprise, for example, twenty primary concentrators, each connected to forty-five telephones and with ten primary trunks between each primary concentrator and the secondary concentrator which, in turn, is connected to the central office by one hundred secondary trunks. Thus in the system of this example, forty-five telephones in each of twenty primary concentrators, or nine hundred telephones, are connected to the secondary concentrator by a total of two hundred trunks, and from the secondary concentrator to the central office by one hundred trunks. Of course the size and trunking plan for such a system is flexible, and the system of this example is not necessarily the optimum size or arrangement.

Figure 2:
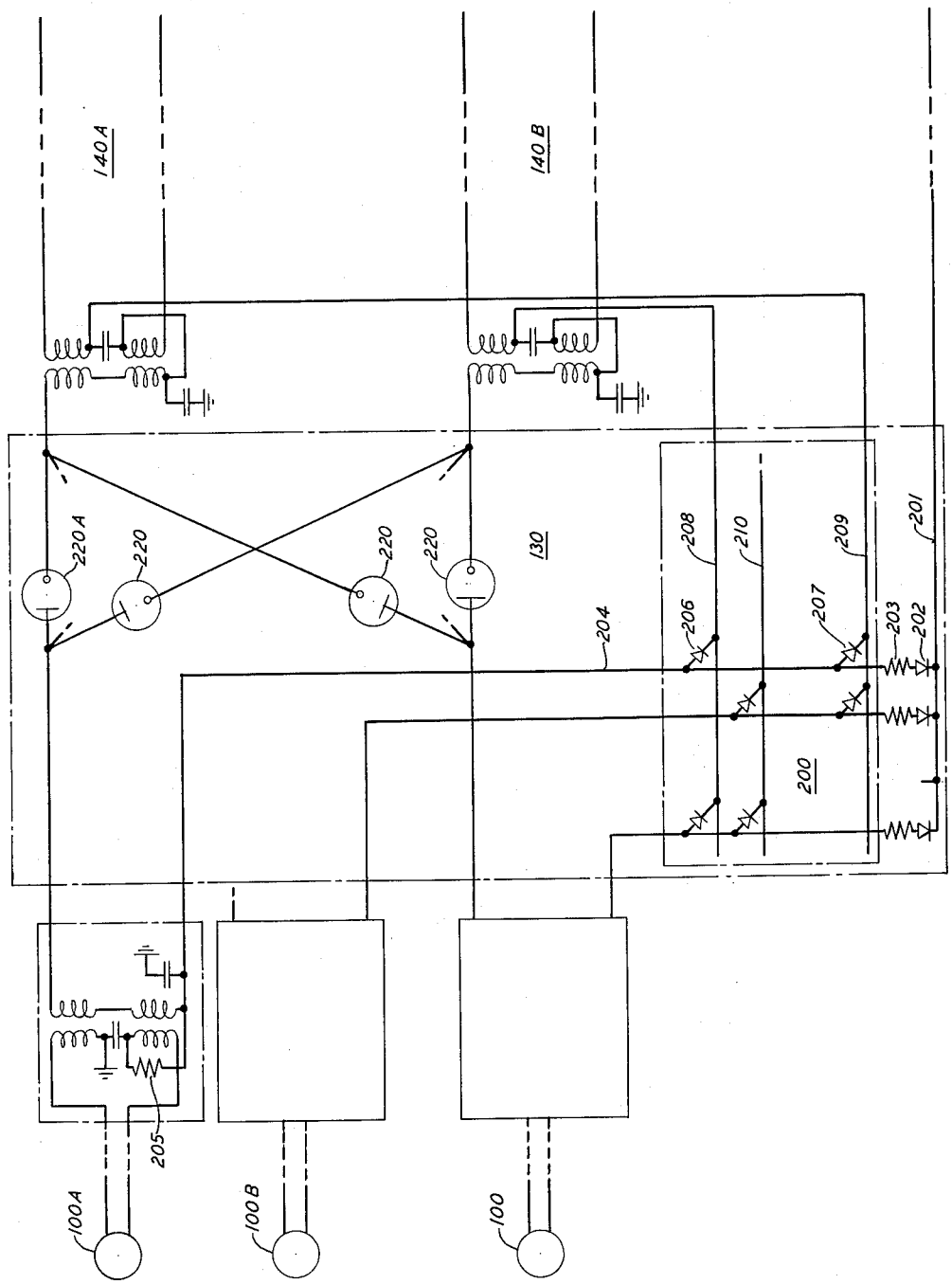
Figure 3:
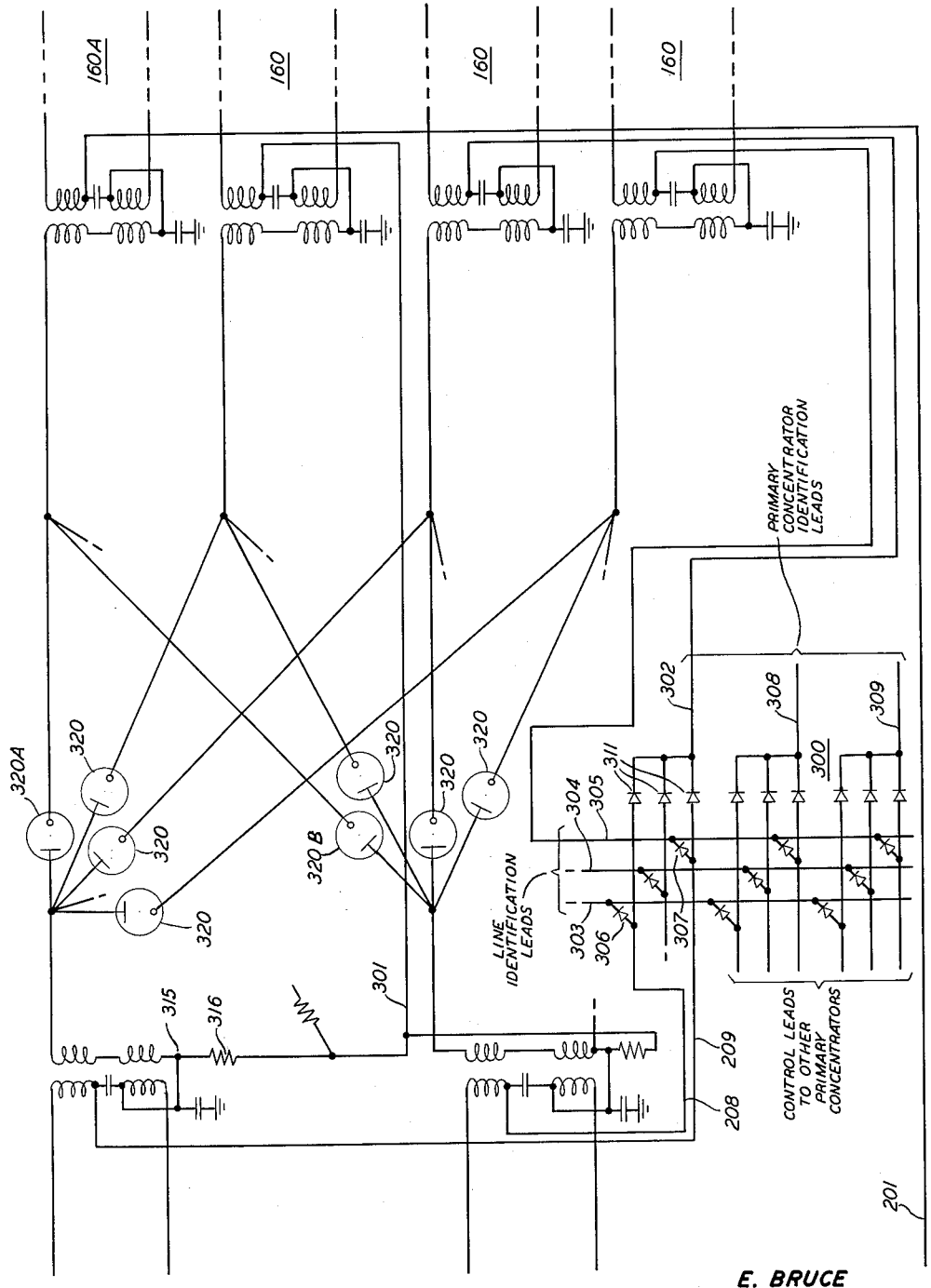

As illustrated in Fig. 2, primary concentrator 130 provides access through a crosspoint switching network for each subscriber telephone 100 to the primary trunks 140 extending in turn to the secondary concentrator in Fig. 3. Such access is gained through a crosspoint network comprising, for example, gas diodes 220. The cross connections between two telephones 100 and two of the primary trunks 140 are illustrated in Fig. 2 and advantageously are of a similar arrangement for all other telephones and trunks connected to this primary concentrator.

A translator network 200 is associated with each primary concentrator switching network such as that illustrated in Fig. 2 and comprises a plurality of diodes arranged in a matrix. A distinct pair of these diodes is connected between each subscriber line and a corresponding pair of line identification wires. Thus diodes 206 and 207 connect the line for telephone 100A to line identification wires 208 and 209, respectively. Also a diode such as 202 is connected between each telephone and a common control lead 201. This arrangement, as described hereinafter, permits the immediate identification of any one of the telephones 100 desiring to place a call, without the necessity for a line scanning operation at the central office, and also facilitates the proper marking of the crosspoints 220 to complete a talking path for the call.

The secondary concentrator unit illustrated in Fig. 3 similarly may comprise a switching network including crosspoint elements 320 which, in this instance, permit access for the primary trunks 140 to the secondary trunks 160 to the central office. In this instance such access is shown for two primary trunks 140 to four secondary trunks 160.

A translator 300, similar to the translator 200 shown for the primary concentrator in Fig. 2, is also included in the secondary concentrator of Fig. 3. The line identification wires from each primary translator 200 advantageously are coupled through one wire of corresponding ones of the primary trunks 140 to the translator 300 by means of composite circuits on the trunks. The power for the subscriber telephones and certain marking potentials for breakdown of the crosspoints in the primary concentrator access switches is in turn supplied through the other wire of the primary trunks.

A coded signaling arrangement is employed in each of the primary and secondary concentrators which, as illustrated, comprises a two-out-of-three code. This signifies that each of the subscriber telephones 100 shown in Fig. 2 may be identified by signals on two of the line identification leads from the primary to the secondary concentrator. This, of course, is merely for purposes of illustration, and the code may be modified to satisfy the number of telephones to be accommodated at each concentrator in accordance with the formula set forth hereinbefore.

A plurality of concentrator identification wires each originate in the secondary translator 300 at diodes terminating all of the line identification wires from a particular primary concentrator and provide a signal to the central office to identify the corresponding primary concentrator. Lead 302, for example, is connected in common to all line identification wires from the primary concentrator of Fig. 2 through diodes of translator 300. Thus there is one concentrator identification lead such as 302 for each primary concentrator, which leads are connected over the secondary trunks 160 to the central office.

In addition, a plurality of line identification leads originate in translator 300 at diodes terminating a corresponding line identification wire from each primary concentrator. Thus, in this illustrative embodiment, there are three line identification leads 303, 304 and 305 connected over the secondary trunks to the central office and through diodes in translator 300 to the corresponding line identification wires from each primary concentrator. These leads serve to identify any calling subscriber line after selection of the primary concentrator to which such calling line is connected, as described hereinafter.

Figure 4:
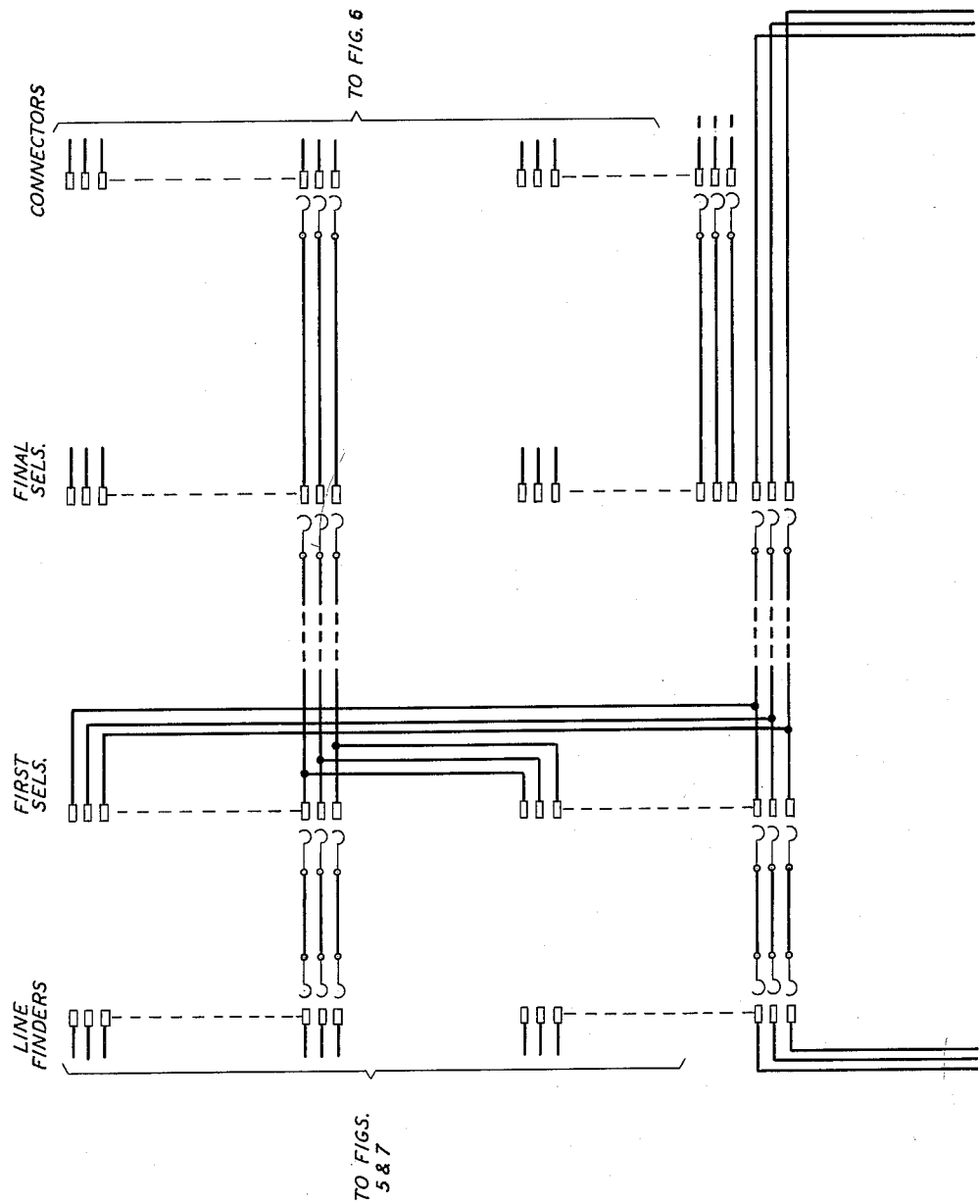
Figure 5:
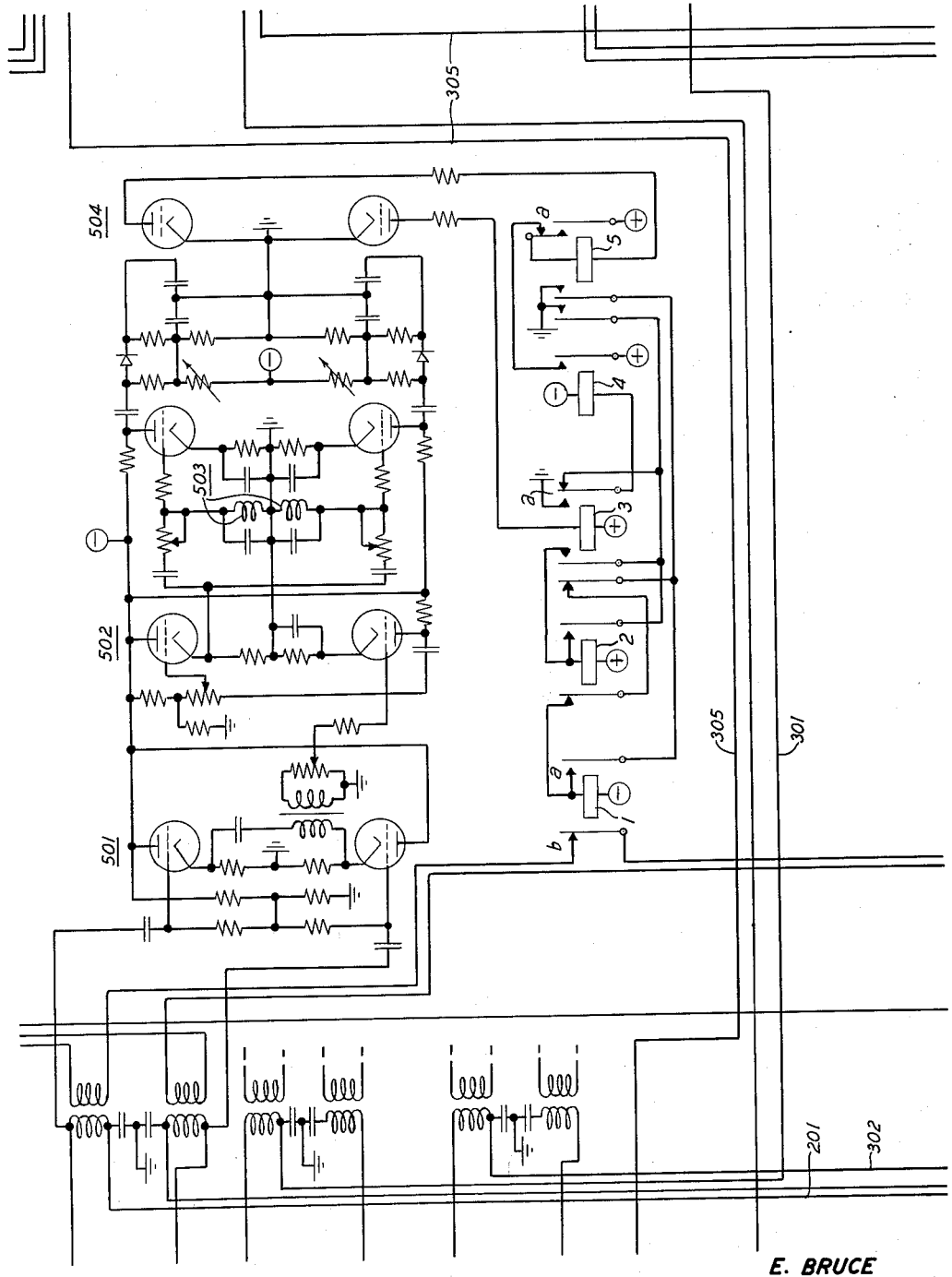
Figure 6:
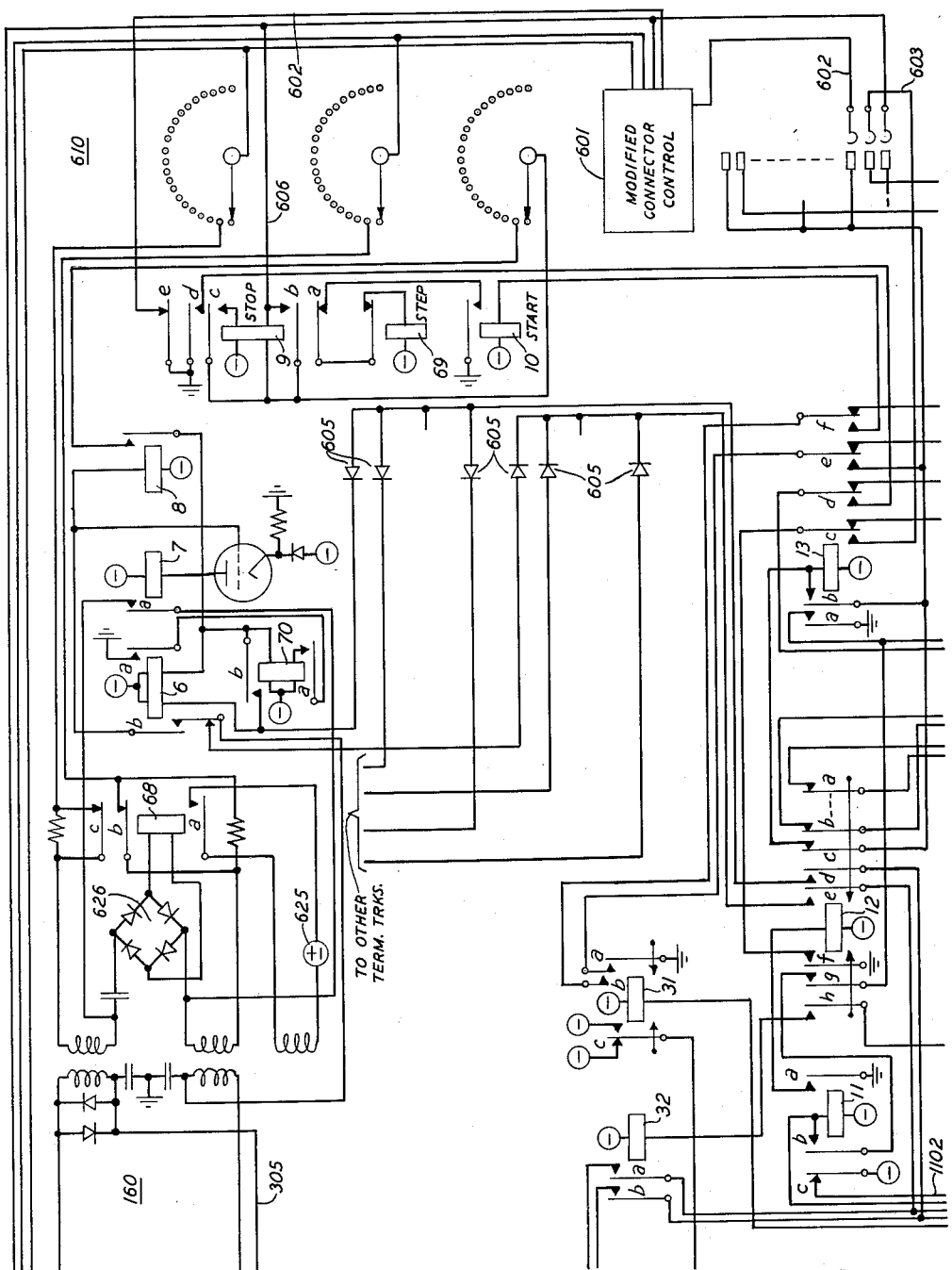
Figure 7:
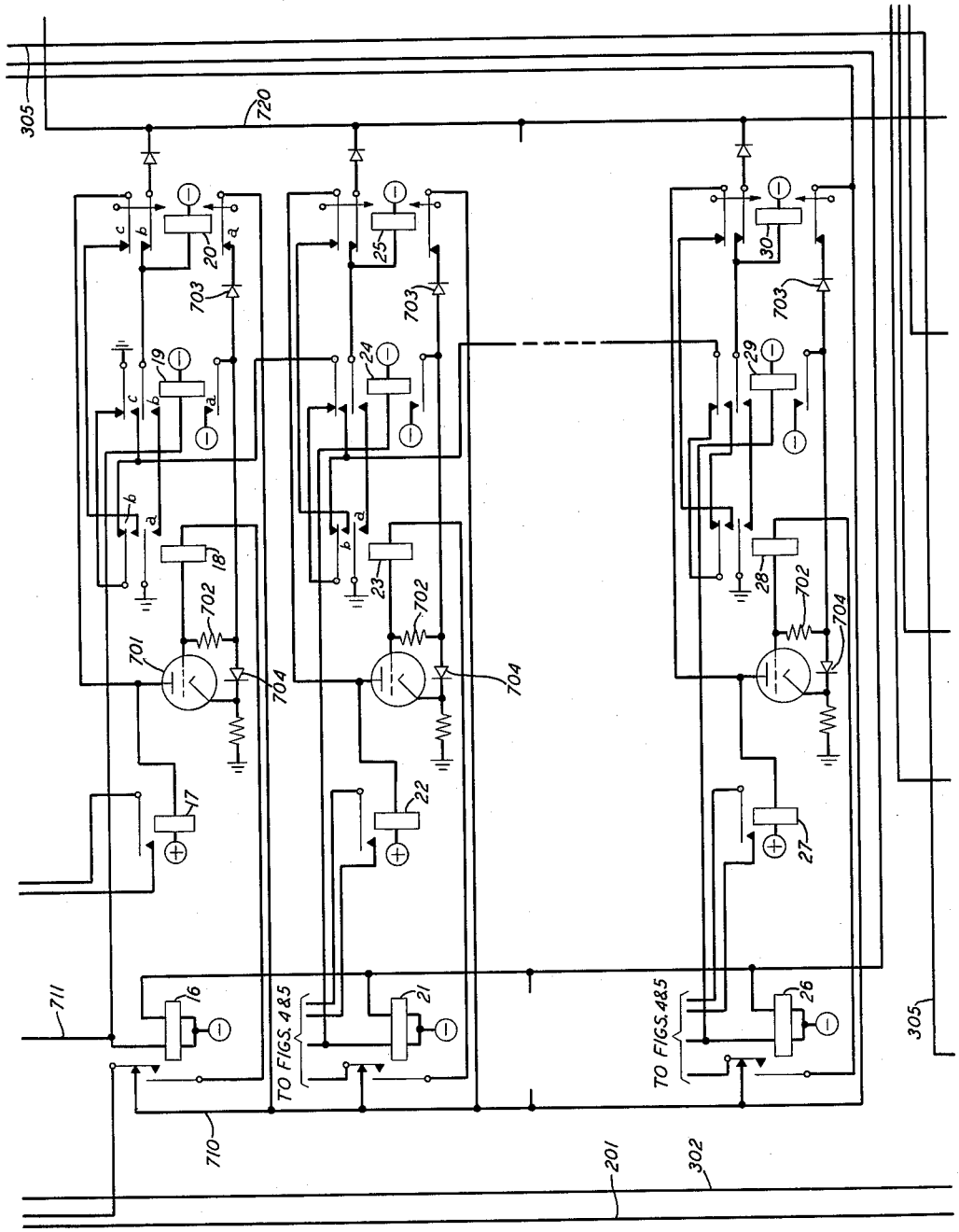
Figure 8:
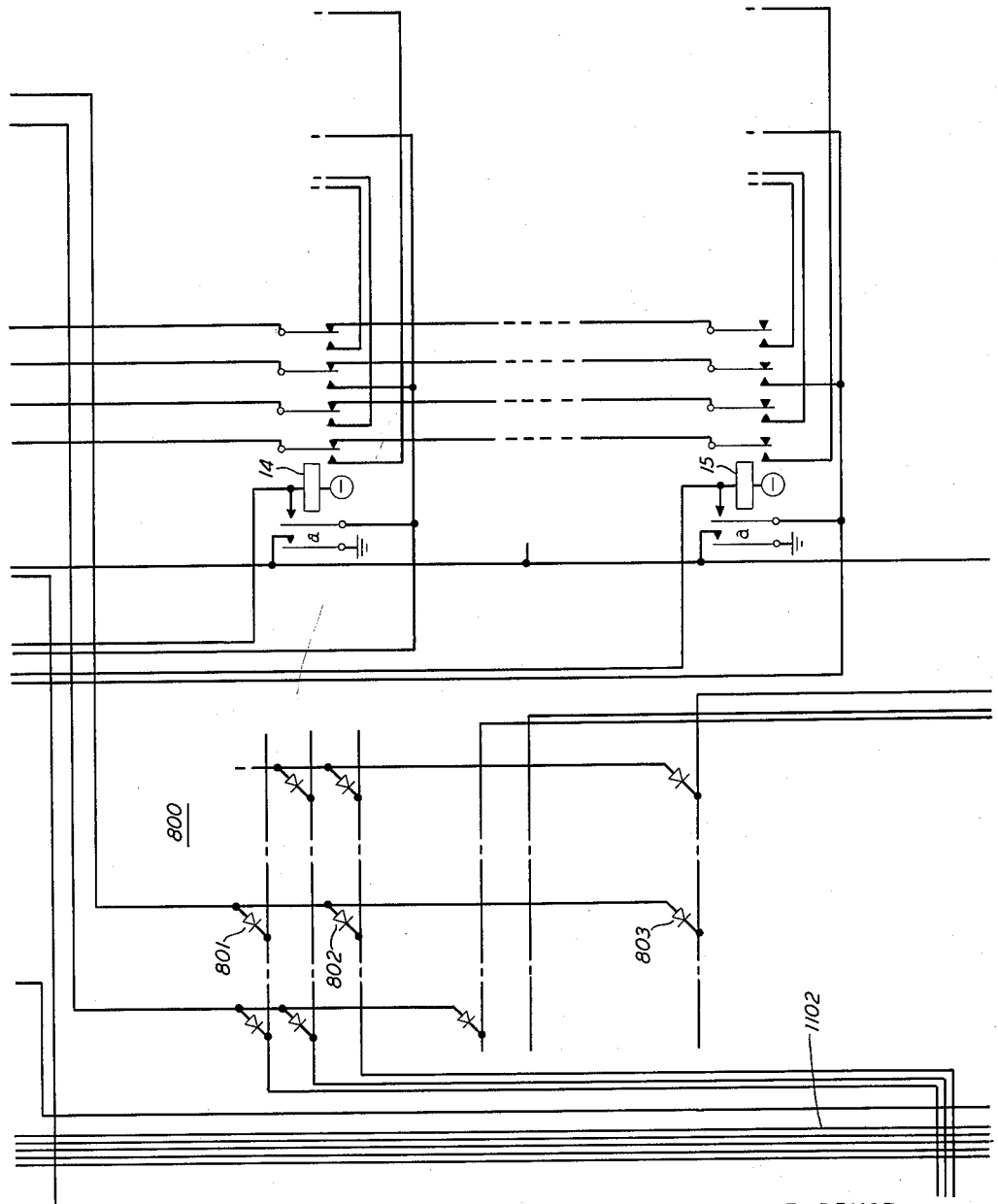
Figure 9:
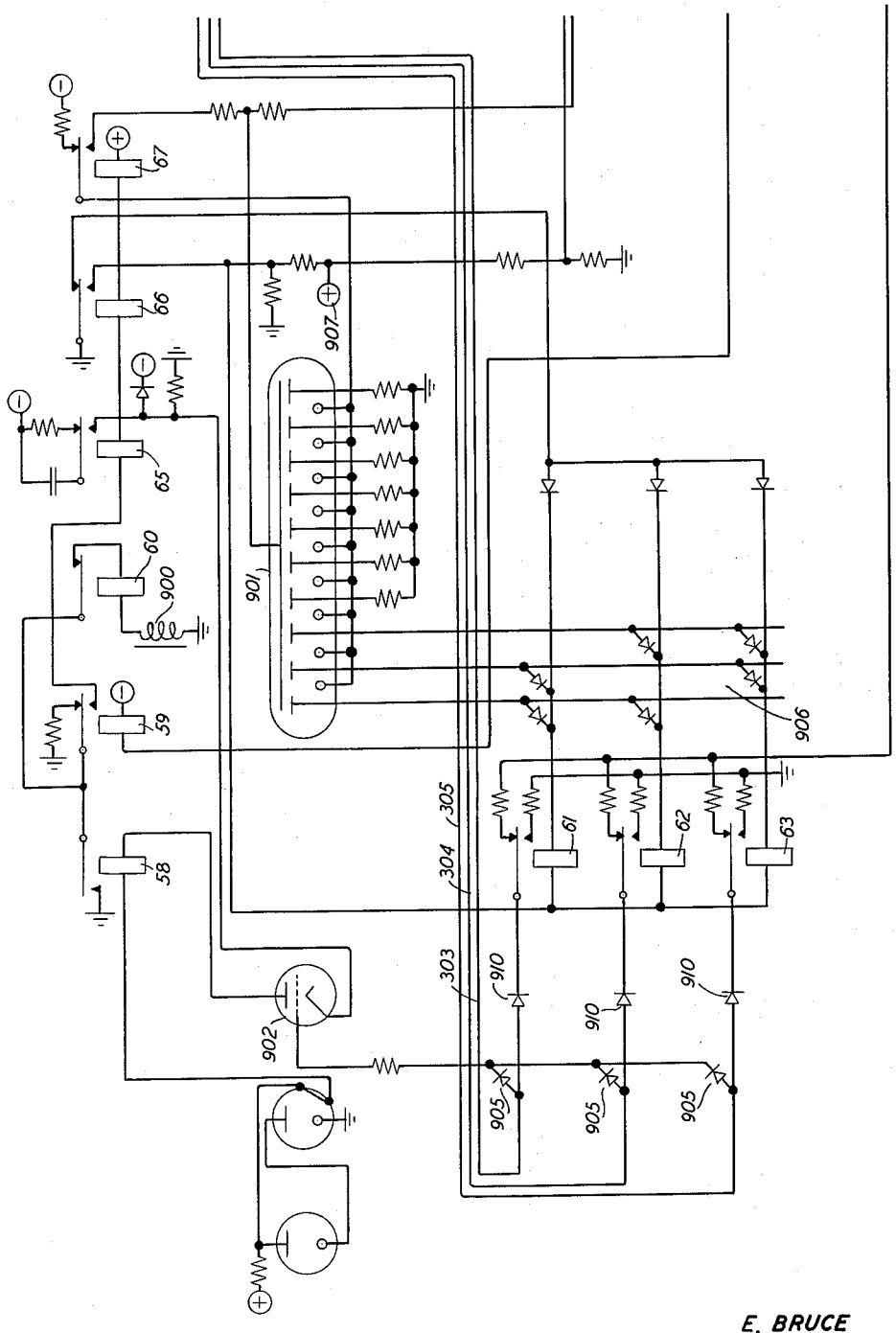
Figure 10:
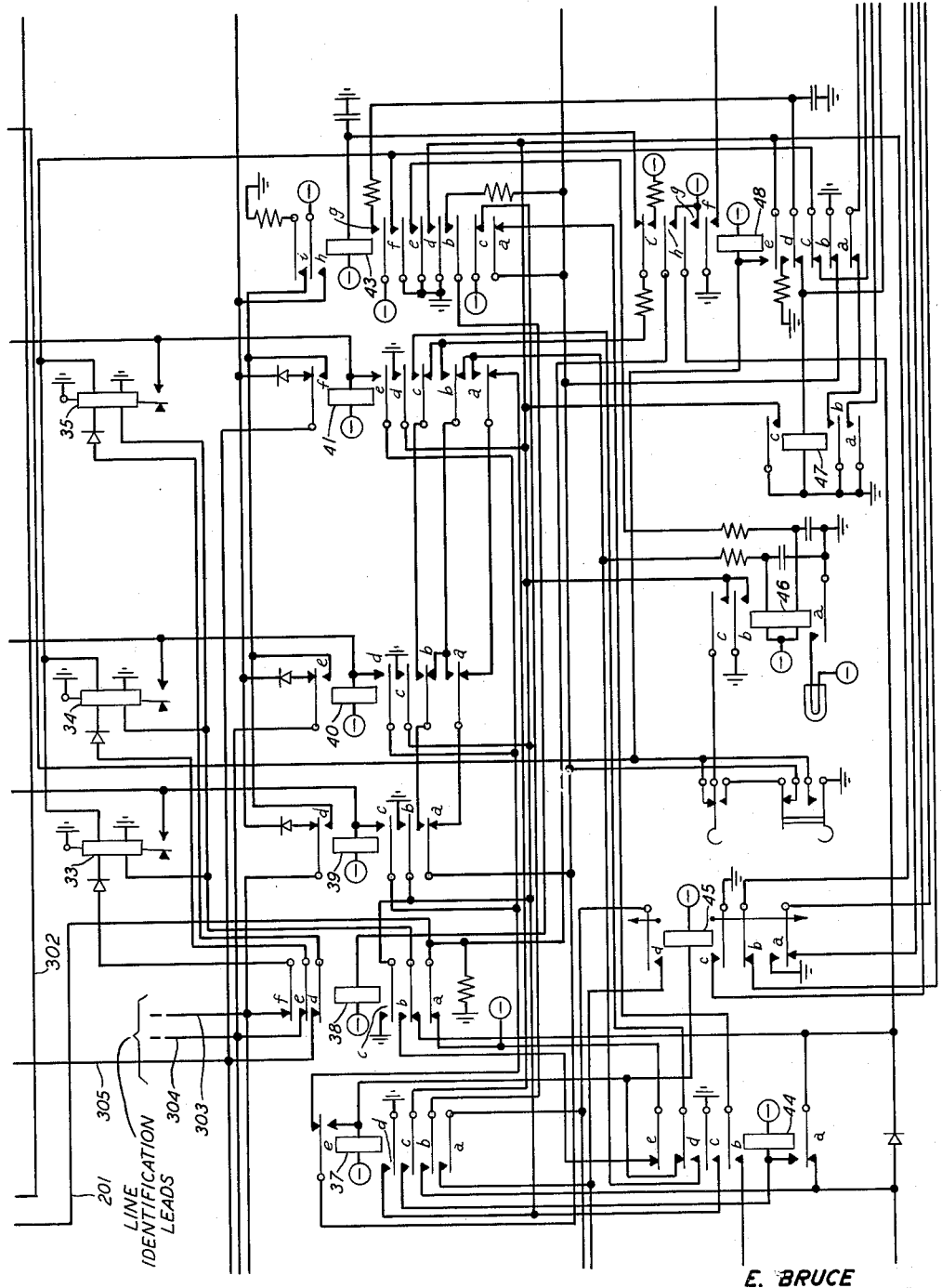
Figure 11:
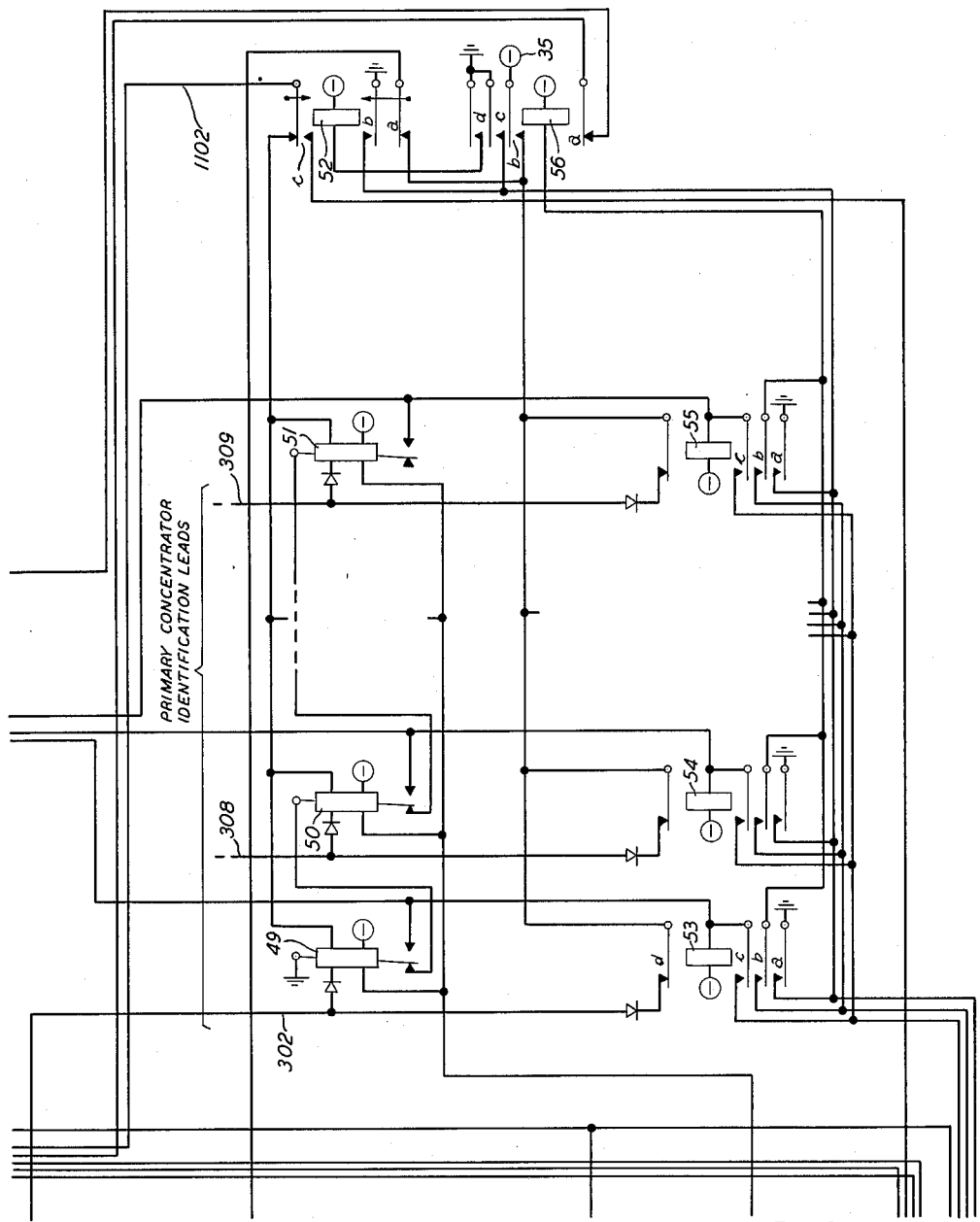

The circuitry of Figs. 5–11 indicates the central office facilities required to complete a connection to or from a subscriber line through the remote concentrator and the step-by-step office equipment indicated in Fig. 4. In brief, the equipment illustrated in Fig. 5 is concerned primarily with registering dial pulse indications from a selected line; the equipment illustrated in Figs. 6 and 8 is concerned with trunk selection on terminating calls from the step-by-step office to subscriber lines in the remote concentrator; the equipment in Fig. 7 serves to establish and monitor connections for originating calls over particular secondary trunks; the equipment illustrated in Fig. 11 provides for the identification of the particular primary concentrator through which a call is originated or terminated; the equipment in Fig. 10 provides for the identification of a particular active subscriber line connected to the selected primary concentrator; and the equipment illustrated in Fig. 9 is concerned with the handling of simultaneous requests for service on two or more subscriber lines connected to the same primary concentrator.

*Originating call*

The operation will first be described with respect to a call originating at a telephone connected to one of the primary concentrators, and it is assumed that in this instance the particular telephone selected is the only one connected to such primary concentrator which is requesting service at this instant. Basically, the operation requires that the central office equipment (1) identify the particular primary concentrator to which the calling line is connected; (2) identify the particular calling line connected to that primary concentrator; (3) complete a talking path from the calling line to the central office through the primary and secondary concentrator stages; and (4) prevent recognition of all other requests for service prior to completion of this connection.

At the outset, battery is present on control lead 201 in the primary concentrator illustrated in Fig. 2, such battery being found by tracing a path through the secondary concentrator of Fig. 3, composite circuits on a secondary trunk 160, and lead 201 extending through the central office equipment of Figs. 5, 7 and 10, to relay 38, contacts a. The battery on control lead 201 is thus present on the line of each telephone 100 connected to the primary concentrator of Fig. 1, the path being completed from lead 201 to telephone 100A, for example, through diode 202, resistor 203, resistor 205 in the line circuit for telephone 100A, through the line transformer, out through the telephone and back through the line transformer to ground.

With the telephones 100 on-hook, the voltage-dividing action of the resistors such as 203 and 205 determines that the voltage at the anode of each of diodes such as 206 and 207 in the translator 200 is more negative than the voltage on their respective cathodes, the latter voltage being derived at this time from battery in Fig. 6, relay 11, contacts c, over lead 1102 through relay 52, contacts c, windings of relays 49–51 in the concentrator detector circuit of Fig. 11 and over concentrator identification lead 302 in Fig. 3. Thus each of the diodes such as 206 and 207 in the translator 200 of the primary concentrator in Fig. 1 is back-biased, and no current flows in the line identification wires such as 208 and 209. Similarly, the diodes in the secondary concentrator translator matrix, Fig. 3, such as 306, 307 and 311, are back-biased.

Assuming, now, that a request for service originates at telephone 100A, the subset is taken off-hook, thereby causing a decrease in the subset resistance which is reflected by a positive change in the voltage at the anodes of individual diodes 206 and 207 associated with the telephone 100A. Diodes 206 and 207 thus are forward-biased so that current is now drawn in the line identification wires 208 and 209. This current flows through the composite circuits on individual primary trunks 140 and into the secondary translator 300, Fig. 3. This current passes at this time through the associated diodes 311 to the primary concentrator identification lead 302.

*Concentrator identification*

The signal on the concentrator identification lead 302 is received by the corresponding relay 49 of the concentrator identification relays 49–51 in the concentrator identification circuit of Fig. 11. Relay 49 will be operated through its upper winding, through relay 52, contacts c, and lead 1102 to battery on relay 11, contacts c, in Fig. 6.

It is assumed, in this example, that a telephone connected to a single one of the primary concentrators is originating a call at this instant so that only relay 49 of the concentrator identification relays 49–51 is operated at this time. Relay 49, in operating, closes a path from ground through its contacts to battery on relay 53, which operates in turn. Relay 56 operates thereafter from ground at relay 53, contacts b, and relay 56, in operating, places the high negative battery at its contacts b on each of the other concentrator identification leads designated 308 and 309. This serves to bypass all concentrator identification relays associated with primary concentrators other than the one illustrated in Fig. 1, thereby preventing any requests from other concentrators disturbing the request from telephone 100A. Such battery will not appear on concentrator identification lead 302 due to the open contacts d of operated relay 53.

In the event that calls originating from telephones associated with primary concentrators other than that associated with telephone 100A request service simultaneously with the request from telephone 100A, the concentrator identification circuit of Fig. 11 will honor the requests on a priority basis. In this instance, more than one of the relays 49–51 will be operated simultaneously. It is noted, however, that the first relay of the group 49–51 in numerical order, in operating, removes ground from the operating paths of follower relays 53–55 corresponding to the higher numbered relays 49–51, so that on simultaneous calls through a plurality of primary concentrators, preference is given to the primary concentrator identified by the lowest numbered of the relays 49–51 to operate simultaneously.

*Line identification*

The operation of relay 56 in Fig. 11 closes a circuit through its contacts d for operation of relay 52, which in turn initiates the selection of the particular telephone, 100A in this instance, desiring service in the primary concentrator which has just been selected by the circuit of Fig. 11. Relay 52, in operating, closes its contacts c, which transfers the battery on relay 11, contacts c, in Fig. 6 from the concentrator identification relays 49–51 to the line identification relays 33–35 in Fig. 10, through relay 48, contacts c. This battery is placed on the line identification leads 303–305, through the operate windings of the respective relays 33–35 and contacts d—f on relay 38.

With telephone 100A desiring service, the line identification leads 303 and 305 from translator 300 in Fig. 3 will carry current at this time, and it is assumed in this example that leads 303 and 305 are connected through the secondary trunks 160 to windings of line identification relays 35 and 33, respectively. In this instance only the connection of lead 305 is indicated in the drawing. These relays, in operating, will connect ground through their contacts to operate the follower relays 41 and 39, respectively.

Since this is a legitimate request for service, identified by current on two and only two line identification leads, relays 41 and 39 will establish a path through a relay tree associated with the relays 39–41 for operation of relay 43. The path for this operation may be traced from battery on relay 43, through relay 48, contacts i; relay 41, contacts b; relay 40, contacts b; and relay 39, contacts a, to ground on relay 48, contacts b. The operation of relay 43 places ground through its contacts i and through contacts f of relay 41 and contacts d on relay 39 on the line identification leads 303 and 305, respectively, to acknowledge identification of the subscriber telephone 100A. Relay 43 also places high negative battery through its contacts h on the other line identification lead, 304, through relay 40, contacts e.

Operation of relay 43 closes an operating path for relay 38 from battery on relay 38, through relay 43, contacts b and relay 48, contacts b, to ground. Operation of relay 38 opens the path to all line identification circuits at its contacts d—f, thereby preventing subsequent operation of line identification relay 34 on requests for service from other lines in the primary concentrator while the connection of telephone 100A is in progress. Relay 38 also establishes a reset path for line identification relays 33 and 35 from ground on the lower windings of relays 33 and 35, through relay 38, contacts b, and relay 44, contacts e, to battery. Relay 38 also opens its contacts a, thereby removing battery from the control lead 201 at all primary concentrators.

The ground placed on the active line identification leads 305 and 303 coupled with removal of battery from control lead 201 results in the anode side of each of the crosspoints 220 in Fig. 2 associated with the telephone 100A requesting service being raised to ground or marked. Thus these crosspoints 220 are prepared to break down and afford a talking path for the telephone 100A, dependent upon the particular crosspoint 220 which is also marked with a proper negative potential on its cathode side.

All crosspoints 220 in this primary concentrator not associated with telephone 100A retain a negative potential on the anode side at this time, due to the continued current flow through the associated line identification wires. Similarly, the negative battery placed on the concentrator identification leads in Fig. 3, terminating all line identification wires from other primary concentrators, maintains current flow from all other system telephones, thereby preventing the breakdown of any of the crosspoints 220 associated with such other telephones for establishment of any calls other than that from telephone 100A at this time.

All of the crosspoints 220 in the primary concentrator illustrated in Fig. 2 have their cathode sides connected through the composite circuits on the primary and secondary trunks via common power lead 301, Fig. 3, to battery in Fig. 6, relay 31, contacts c. This battery is not sufficiently negative to permit breakdown of the primary crosspoints 220. However, each crosspoint 220 associated with the telephone 100A is now primed to connect the subscriber line to any of the primary trunks 140.

The anode side of each crosspoint 320 is also connected to the negative battery on power lead 301. This battery is made less negative, to mark the anode side of all crosspoints 320 by operation of relay 47, Fig. 10, from ground on its winding, through relay 48, contacts d, and to battery on contacts g of relay 43, the latter relay having been operated during the line identification operation. Relay 47 closes a path from ground through its contacts a to battery on relay 31, which operates to place the less negative battery on power lead 301. The cathode side of each crosspoint 320 receives its marking potential as follows: Relay 32 in Fig. 6 was priorly operated from its battery, through relay 12, contacts h and relay 48, contacts b, to ground. The operation of relay 43 in Fig. 10, as described, thus provides an initial marking potential to the cathode side of each of the crosspoints 320 over a path from negative battery at relay 43, contacts g, through relay 48, contacts d, relay 32, contacts a, over lead 710, Fig. 7, and through contacts on relays 16, 21 and 26 and the composite circuits of the secondary trunks to the crosspoints 320.

The arrangement is such that a secondary crosspoint is connected between each primary trunk 140 and the marked secondary trunks 160. Thus crosspoints 320A and 320B are connected between secondary trunk 160A and promary trunks 140A and 140B, respectively. Other secondary crosspoints are available to connect the trunks from other primary concentrators to the secondary trunks 160. Resistors, such as 316, are provided between the power lead 301 and each primary trunk termination at the secondary concentrator. The resistance 316 provides a voltage drop thereacross upon breakdown of one of the crosspoints 320 connected to primary trunk trunk 140A which serves to back-bias the other crosspoints 320 connected to the same primary trunk, thereby preventing their breakdown. A priorly occupied primary trunk will also have all associated crosspoints 320 back-biased so that such trunks will not be concerned in a connection for the instant call. Thus application of the initial marking potential on the cathode side of the secondary crosspoints permits breakdown of crosspoints 320 to every available primary trunk 140 at this time.

As noted earlier, each primary crosspoint 220 associated with the calling telephone 100A is marked on its plate side. Each available primary trunk 140 will reflect the more negative potential due to breakdown of secondary crosspoints at the cathode side of the corresponding primary crosspoints to permit their breakdown. It is possible that paths may be established from telephone 100A to the central office through a plurality of primary trunks 140 and through a plurality of secondary trunks 160. However, the first one of such primary crosspoints 220 to break down will tend to back-bias all others.

The selection of a particular secondary trunk 160 to handle this call is accomplished by the circuit of Fig. 7. The process involves substitution of a final marking potential for the initial marking potential on the cathode side of the group of crosspoints 320 connected to the selected secondary trunk 160 and removal of the marking potentials from all other secondary crosspoints. Operated relay 47, Fig. 10, connects ground through its contacts *b*, relay 48, contacts *a*, and relay 32, contacts *b*, Fig. 6, to battery on a winding of each trunk selection relay 16, 21 and 26, Fig. 7. These relays, in operating, transfer the initial marking potential on lead 710 to alternate paths through the trunk marking circuits. For example, the secondary trunk 160A connected to contacts of relay 16 now receives the initial marking potential on lead 710 through relay 20, contacts *a*, resistor 702, the winding of relay 18 and the make contacts of relay 16.

Assuming that conducting paths have been established through the secondary trunks 160 associated with each relay 16, 21 and 26, each of the relays 18, 23 and 28 will draw current from the associated secondary trunks 160 and be operated. Relays 19, 24 and 29 are connected to line finder switches in the step-by-step equipment illustrated in Fig. 4 over leads such as 711 connected to relay 19, the connections from relays 24 and 29 being indicated but not shown. At this time these leads are connected to battery at the step-by step switches of Fig. 4, so that the relays 19, 24 and 29 are not operated.

A chain circuit involving contacts on relays 18, 23 and 28 and 19, 24 and 29 is now activated to determine which trunk relay 17, 22 or 27 will be operated to connect the call from telephone 100A to the central office switching network. This chain circuit originates at ground through relay 19, contacts *c*. Assuming the first trunk circuit is available to handle the call, relay 19 is unoperated so that this ground is transferred through operated relay 18, make contacts *b*, and relay 20, break contacts *c*, to battery on relay 17. Relay 17, in turn, closes its contacts to connect the calling line through to a line finder in the step-by-step equipment of Fig. 4. When the line finder has located this particular connection, it will return ground on lead 711 to operate relay 19 in Fig. 7, as well as providing a holding path for relay 16 through its other winding.

Relay 19, in operating, connects the final marking potential at its contacts *a*, through resistor 702, relay 18 and the associated secondary trunk 160A to the cathode side of the secondary crosspoints connected to this secondary trunk. Relay 18 places ground through its contacts *a*, through relay 19, contacts *b*, and relay 20, contacts *b*, on stop mark lead 720, which in turn operates relay 48 in Fig. 10 to restore all selection circuits to normal, place more negative battery at relay 31, contacts *c* on power lead 301 and remove the initial marking potentials from the cathode side of all other secondary concentrator crosspoints. Thus, in this example, only crosspoint 320A of the initially operated secondary crosspoints remains in that state and provides the talking path for telephone 100A in conjunction with with the operated primary crosspoint 220A.

Slow operate relay 20, Fig. 7, is operated to remove ground from relay 48 by opening relay 20, contacts *b*. Thus relay 48 is operated for a sufficient time to restore all circuits to normal and then is itself restored to normal preparatory to receipt of the next request for service. Relay 20, in operating, also opens its contacts *c* to break the operating path for relay 17. However, an alternative path through the tube 701 is already established with the proper grid potential maintained by battery on relay 19, contacts *a*.

Subsequent calls seeking a trunk assignment will be directed to the next set of trunk relays 21–25 in the preference chain, since the ground on contact *c* of relay 19, utilized to operate the selected relay 17, is now transferred from the first preference circuit to the second preference circuit including relays 21–25. Subsequent connections are thus made on this preferential selection basis.

Simultaneous requests for service

As priorly indicated in connection with the concentrator identification circuitry of Fig. 11, simultaneous requests for service by telephones connected to different primary concentrators are resolved on a preference basis determined by the circuits of Fig. 11. However, a unique problem is presented in the identification of telephones connected to the same primary concentrator which originates requests for service simultaneously.

As priorly indicated, the line identification circuit of Fig. 10 determines that two and only two line identification leads are carrying current at any instant and acts to find these two leads and place an appropriate signal thereon to mark the originating telephone. In the event that more than one call is originated simultaneously through the same primary concentrator, more than two of the line identification leads will be carrying current at one time, and it is impossible for the circuit of Fig. 10 alone to determine which combination of these leads is associated with a particular telephone. In this instance, therefore, the circuit of Fig. 10 transfers the necessary information to the circuit of Fig. 9 which then performs a preferential selection of one of the calling lines and, upon completion of the connection of this line, provides for selection of the next calling line.

To illustrate this operation, let it be assumed that telephones 100A and 100B originate requests for service at substantially the same time. Thus all three line identification wires 208, 209 and 210 will carry current, thereby enabling all of the line identification relays 33–35 in Fig. 10. The follower relays 39–41 will then be operated. The relay tree associated with the follower relays 39–41 will indicate this plural request condition by preventing the establishment of a path to ground on relay 48, contacts *b*, for the operation of relay 43, thereby preventing any alteration of the potentials appearing on the line identification leads at this time. Instead, the ground on relay 48, contacts *b*, is connected through relay 39, make contacts *a*; relay 40, make contacts *b*; relay 41, make contacts *c*; and relay 44, break contacts *d*, to battery on relay 37 and also to battery on relay 45.

Relay 37, in operating, prepares the simultaneous call selection circuit of Fig. 9 for operation and also releases the line identification relays 33–35 and their follower relays 39–41 by connecting battery at relay 43, contacts *c*, through relay 37, contacts *b*, relay 44, contacts *a*, and relay 38, contacts b, to ground through the reset windings of polar relays 33–35.

The circuit also checks to assure that all of the relays 33–35 and 39–41 have been restored to normal by following such restoring with the operation of relay 44 from its battery through relay 37, contacts c, and the break contacts a on each of the follower relays 39–41, to ground on relay 48, contacts b.

The operation of relay 44 activates the circuit of Fig. 9 by establishing an operating path for relay 59 from battery on relay 59, through relay 44, contacts b, and relay 43, contacts a, to ground on relay 48, contacts b. It also breaks the path from battery to the reset windings of relays 33–35 at its contacts a. However, the scanning operation is sufficiently rapid that the relays 33–35 fail to operate through their upper windings from current on the identification leads 303–305 before the circuit of Fig. 9 has located a desired pair of these leads.

Relay 59, in operating, closes an operating path for relays 60, 65, 66 and 67 from battery on relay 67, through relays 66 and 65 and through the contacts of relay 59 and relay 60, to ground. A coil 900 in series with relay 60 causes it to operate intermittently, thereby operating relays 65, 66 and 67 intermittently.

Relay 67 controls the operation of a gas stepping tube 901 which indicates at each cathode a particular line under scrutiny at the time; tube 901 may be a cold cathode stepping tube of the type generally shown in M. A. Townsend Patent 2,625,810, April 21, 1953. Relay 65 controls the detector tube 902 which has its grid connected to the line identification leads 303–305 through diodes 905. Relays 61–63, associated with corresponding ones of the line identification leads 303–305, are connected to the stepping tube 901 by way of diodes in matrix 906.

At each step taken by the stepping tube 901, the relays 61–63 are enabled selectively in pairs from the positive potential source 907 at the anode of the particular stepping tube position, through the particular diodes in matrix 906 associated with this stepping tube position, through the windings of the corresponding relays 61–63 to ground on the make contacts of relay 66.

A pair of relays 61–63, in operating, connect a corresponding pair of the line identification leads 303–305 through the diodes 910, to ground. The nonselected line identification lead will receive negative battery from relay 43, contacts c, through relay 37, contacts b, and through contacts on the nonoperated one of relays 61–63. Thus the line identification leads are examined progressively in pairs with those not currently under examination being connected to battery to prevent operation of the associated ones of the line identification relays 33–35.

The operation of the circuit of Fig. 9 ceases when a pair of line identification leads under examination provides sufficient current, indicating an active line, to provide a voltage through diodes 905 to the grid of tube 902 to permit conduction therethrough for operation of relay 58. Relay 58, in operating, holds relays 65, 66 and 67 operated from ground at contacts of relay 58, through contacts of relay 59, and thereby prevents further stepping of the tube 901. The current on the active pair of line identification leads 303–305 through the corresponding contacts d—f of relay 38 then is permitted to operate the corresponding pair of line identification relays 33–35 in Fig. 10, through the contacts of the operated pair of relays 61–63 and diodes 910, relay 38, contacts d and f, respectively, through one winding of the pair of relays 33–35, relay 48, contacts c, relay 52, contacts c, and relay 11, contacts c. The call is processed thereafter in the manner described hereinbefore with relay 59, which initiated the stepping action, restored by operation of relay 43, Fig. 10, to break the operating path at its contacts a.

Upon completion of the processing of this call, the circuit of Fig. 9 will be reactivated if more than one request is again present. In this instance relay 45, Fig. 10, which is slow to release, will have held, through its contacts d, the stepping tube 901 at the position to which it stepped to select the prior call, such that hunting proceeds from the last selected line.

Alarm relay 46 in Fig. 10 and associated circuitry are activated by any request which is not processed in a specified time or by an erroneous request comprising a single active line identification lead. In such instances the circuit may be arranged to automatically restore all circuitry and begin the selection anew or, if desired, to lock-up the circuits for detailed examination.

*Terminating call*

The circuit in accordance with our invention is prepared to accept calls from foreign exchanges for termination in lines connected to primary concentrators in this system. Such calls would be received through the step-by-step switching equipment indicated in Fig. 4 and through a final selector, as shown therein, to a connector circuit 601 in Fig. 6. The connector switch in this instance would step to the proper horizontal and vertical position associated with the particular called subscriber line that has been dialed by the calling subscriber. When it reaches this point, a ground on the stop relay 9, contacts e, will be connected through the connector 601 on lead 602 and through relay 12, contacts c, to battery on preference relay 13.

Other terminating calls may have completed a similar circuit through individual connectors such as 601 to corresponding ones of the preference relays 13–15. When one or more of these requests are received, indicated by operation of one or more of the preference relays 13–15, the gating relay 11 will be operated from its battery through relay 56, contacts a, in Fig. 11, to ground, on contacts a of each of the operated preference relays 13–15. It is noted that the operation of the gating relay 11 depends upon the nonoperation of relay 56, Fig. 11. Since relay 56 is operated when there is a request for service from telephones connected to the primary concentrators, such originating calls are given preference over terminating calls.

Assuming in this instance that the circuit is not handling an originating call at this instant, relay 11 is operated, and the determination of which terminating call shall gain access to a selected secondary trunk 160 proceeds. Relay 11, in operating, places ground through its contacts a on follower relay 12, causing it to operate. The operation of relay 12 opens its contacts a, b and c to lock-out subsequent terminating calls from this portion of the circuit during the trunk selection and assignment operations. Assuming that a request for a terminating call appeared in the circuit including the first preference relay 13 prior to operation of gating relay 12, ground appearing on relay 12, contacts f, may be traced through relay 13, make contacts c, to lead 603, terminating in the connector 601. This ground will be denied to all other connectors serving terminating calls at this instant, since such ground must pass through the relay tree associated with the preference relays 13–15. The first preference relay in this group which is operated will pass this ground to its associated connector, thereby blocking its application to connectors associated with any of the other preference relays.

The ground on lead 603 of connector 601 will be transferred through its bank contacts to diodes 801, 802 and 803 of the diode matrix 800 in Fig. 8. The ground is transferred through diodes 801 and 802 to the line identification circuit of Fig. 10. In this instance the ground through diode 801 operates follower relay 39; the ground through diode 802 operates the follower relay 41. Similarly, the ground through diode 803 serves to operate follower relay 55 in the concentrator identification circuit of Fig. 11.

Relay 55 places ground, through its contacts b, on relay 56, which then operates to place battery through its contacts b on all concentrator identification leads other than the one associated with the follower relay 55. As described earlier for originating calls, such a marking of the concentrator identification leads narrows the called party selection to a particular primary concentrator.

The circuit of Fig. 11 then transfers controls to the line identification circuit in Fig. 10, as also described hereinbefore. Follower relays 39 and 41 were priorly operated from ground through the diodes 801 and 802, respectively, in the matrix 800 of Fig. 8. The line identification circuit of Fig. 10, noting the operation of two and only two of the follower relays 39–41, operates relay 43 from its battery, through the chain circuit on the follower relays 39–41, to ground on relay 48, contacts b. The proper line identification leads 303–305 are thereafter placed at ground and all others at a high negative potential, in the manner described hereinbefore for an originating call. Also the marking of the proper crosspoints in the primary and secondary concentrators to provide a talking path to the called subscriber, now identified by the proper signals on the line identification leads by the circuit of Fig. 10, proceeds in the manner described in connection with the trunk assignment for an originating call.

The trunk mark signals; i.e., battery for pre-marking and ground preparatory to marking, which originate respectively at relay 43, contacts g, and relay 47, contacts b, are passed, in this instance, through relay 12, contacts e and d, respectively, and thereafter through the diodes 605 to mark the secondary trunks 160 for terminating calls. One of the terminating call trunk circuits is illustrated in Fig. 6 and, assuming a connection has been completed including this trunk circuit for the terminating call being described, the premarking battery connected through relay 12, contacts e, and one of the diodes 605 in Fig. 5 is connected through the break contacts on trunk selection relay 6 and over the control lead of the trunk circuit to the cathode side of one of the crosspoints 320 in the secondary concentrator of Fig. 3.

The ground received through relay 12, contacts d, and the diodes 605 a short period after the appearance of the premarking battery, is connected to the winding of relay 6. Relay 6, in operating, transfers the signal appearing on one wire of the secondary trunk 160 through its make contacts to the winding on relay 8. If the secondary trunk is carrying current at this time, signifying a completed connection, relay 8 will operate and close a path from battery on relay 6 to a terminal on one bank of the trunk hunting selector 610 illustrated in Fig. 6.

The trunk hunting operation of the selector 610 is established and proceeds in the following manner: Relay 47 in Fig. 10, supplying the ground through its contacts b when operated, also supplies ground through its contacts a for operation of relay 31. Relay 31, in operating, closes its contacts b to provide ground through relay 13, make contacts f, to battery on start relay 10. Operation of the start relay 10 causes periodic operation of the stepping relay 69, which in turn causes the trunk hunting selector to begin stepping around the contacts until such time as the battery indication from relay 6 is encountered.

At this point the battery is transferred through the selector switch contacts and through a winding on the stop relay 9 to lead 606, which at this time carries a ground indication from the step-by-step switches of the switching network in Fig. 4. Thus stop relay 9 is operated and locks itself from its battery through its upper winding, contacts c and contacts b, to the ground on lead 606. The stop relay 9, in opening its contacts a, prevents further operation of the stepping relay, and the trunk hunting selector will remain in the position to which it has stepped to find battery.

Operation of the stop relay 9 removes ground at its contacts e from the lead 602, such that another selector switch having an appearance for this particular selected trunk will not stop at this trunk in selecting a connection for a future terminating call.

Operation of the stop relay 9 will also connect ground at its contacts d, through relay 13, make contacts d, over stop mark lead 720 to battery on relay 48 in Fig. 10. As noted hereinbefore, operation of relay 48 serves to restore all of the trunk and line selection circuitry to normal, preparatory to receipt of a subsequent call.

The secondary trunk 160 illustrated in Fig. 6 thus has a talking path established through the trunk hunting selector 610 to the calling subscriber and through the secondary and primary concentrators to the called subscriber. In this instance relay 7 in Fig. 6 provides line supervision at its contacts until the called subscriber terminates the call, thus reducing the current on the trunk control lead which, in turn, reduces the voltage on the grid of tube 502 causing relay 7 to release. Release of relay 7 provides an indication to the step-by-step equipment that the called line has been restored.

With the secondary trunk priorly occupied, relay 70, Fig. 6, operates from the ground on lead 606 provided through the contacts of relay 8. Relay 70 is then locked by ground on relay 6, contacts a, through relay 70, contacts a. The operation of relay 70 provides a safeguard against the use of the occupied secondary trunk 160 when the called telephone is restored during the trunk marking operation for a subsequent terminating call. Normally in this situation battery would appear on the selector 610 contact corresponding to this trunk. With relay 70 in the circuit, however, the marking ground which originally operated relay 6 is now shunted through relay 70, contacts b, and is available at the contacts of the trunk hunting selector rather than the battery from relay 6 that it is seeking.

*Dial pulse indications*

The circuit in Fig. 5 serves to recognize dial pulses upon establishment of an originating call. A signal receiver of this type is shown, for example, in Horton, Jr.-Murphy-Vaughan Patent 2,299,822, issued October 27, 1942. While it is possible to recognize direct-current dial pulses, it is more feasible in a two-stage concentrator arrangement, in accordance with the instant invention, to utilize an alternating-current dial pulse arrangement in which the telephone subset generates alternating-current tones which are recognized at the central office.

For purposes of illustration, a telephone subset may be chosen which will provide a two-tone, alternating-current dial pulse, the higher frequency tone indicating the open or high impedance condition and the lower frequency pulse, the low impedance dial pulse condition.

The circuit of Fig. 5 receives the high and low tones from the telephone subset in a balanced amplifier arrangement 501, the output of which is directed through a two-stage, resistance-coupled amplifier 502 to raise the tone signals to a suitable level and through two tuned circuits 503, the outputs of which are amplified in the final stage 504 and transmitted to relays 3 and 5. Relay 3 will operate with the low frequency tone passing through its winding and relay 5, in turn, responds to receipt of the high frequency tone.

In normal dialing operation, the low frequency tone will appear first, so that relay 3 will operate, followed by the operation of relay 5 upon appearance of the subsequent high frequency tone. Relay 4 in this group is a sequence relay which serves to preserve the alternate operation of relays 3 and 5, and thus the alternate appearance of the low and high frequency tones.

The sequence of operations assures that with the appearance of speech or spurious signals simultaneous with a proper tone frequency indicating a dial pulse, relay 2 will operate to insure that such spurious indications are not repeated to the step-by-step equipment. Relay 1 reacts to a normal sequence of received dial pulses to open and close the line connection to the step-by-step equipment at its contacts *b*. This action in turn provides direct-current pulsing to the central office equipment.

The ringing procedure on terminating is to utilize the original ringing signal from the step-by-step equipment, as transmitted through the talking path leads in the selector 610, to operate relay 68. Relay 68, in operating, connects alternating-current tone ringing signals from source 625 at its contacts *a* to the associated trunk 160 for ringing of the telephones. The diode rectifier bridge arrangement 626 permits the original low frequency ringing signal to maintain relay 68 operated. Also the Zener diode arrangement 627 prevents transmission of the original ringing signal over the secondary trunk 160.

As noted above, the telephones 100 employed in a system in accordance with our invention advantageously provide alternate-current dialing signals and accept alternate-current ringing signals. Additionally, the terminating resistance of the telephone is one value when the telephone is idle and a smaller value when the telephone is in use. The resistance change, as described hereinbefore, establishes the proper voltage at the translator to permit identification of the telephone requesting service.

Figure 13:
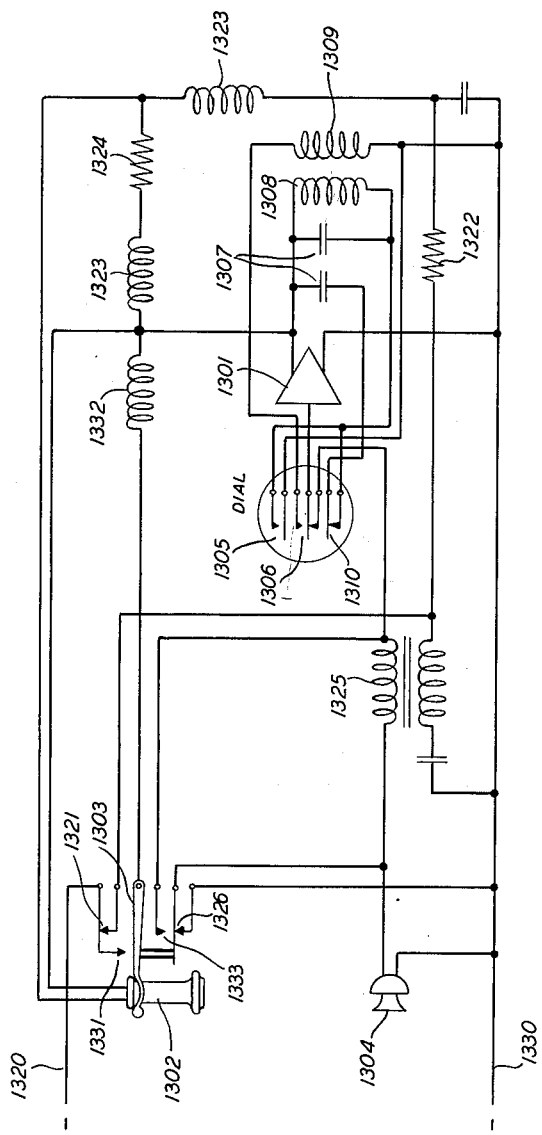
Fig. 13 is a schematic representation of one particular telephone subset which may be employed with a telephone system in accordance with our invention.

Referring now to Fig. 13, there is shown a schematic representation of one particular telephone subset that may advantageously be employed in a telephone system in accordance with our invention. This subset differs from that normally employed in that the ringing current from the tone ringing signal source at contacts of relay 68, Fig. 6, instead of actuating a bell in the subset, is amplified by a transistor amplifier 1301 and applied to the receiver 1302. This obviates the necessity for large ringing currents to be transmitted from the central office to actuate a bell. Also when the receiver 1302 is removed from the telephone hook 1303, the transistor amplifier 1301 is then connected to the microphone 1304 so that satisfactory speech or voice currents may be transmitted with less power supplied from the central office.

A further feature distinguishing this subset from that normally employed is the transmission of alternating-current tones in place of the familiar direct-current dialing technique. The use of alternate-current tones assures accurate recognition of dialing indications through the two concentrator stages of the system in accordance with our invention, whereas the recognition of direct-current dial pulses through such a system is marginal.

Closure of the dial-off-normal contacts 1305 and 1306 upon initial actuation of the subset dial places a distinct frequency tone on the line through the transistor amplifier 1301, the frequency being determined by the arrangement of capacitors 1307 and inductance 1308 connected in parallel in a path between the transistor amplifier 1301 and the subscriber line and coupled through inductance 1309. At each break of the dial pulse contacts 1310 the transmitted signal is changed to a second distinct frequency by removal of one of the capacitors 1307 from the resonant circuit. The arrangement thus presents two distinct frequency signals alternately to the central office equipment in Fig. 6 which in turn converts them to direct-current signals for application to the step-by-step equipment, as described hereinbefore.

In the description of the operation of the line identification functions of a system in accordance with certain features of our invention, the telephone was assumed to have a certain resistance when in an on-hook condition and a lower resistance when the telephone was in an off-hook condition for proper voltage dividing action and consequent biasing of the translator diodes to convey line identification signals.

In the specific subset depicted in Fig. 13, the on-hook direct-current path is defined from wire 1320 through the contacts 1321, the resistance 1322, the coils 1323 and resistance 1324, the transistor amplifier 1301, the transformer 1325 and contacts 1326 to wire 1330. The off-hook direct-current path is defined from wire 1320 through the contacts 1331, the inductor 1332, the transistor amplifier 1301, the contacts 1333 and through the microphone 1304 to the wire 1330. Thus in the specific subset shown, the change in resistance between the two direct-current paths is mainly due to the inclusion of the resistance 1322 and 1324 and inductors 1323 in the on-hook condition and their omission from the off-hook direct-current path.

It is to be understood that the above-described arrangements are illustrative of the application of the principles of the invention. Numerous other arrangements may be devised by those skilled in the art without departing from the spirit and scope of the invention.

What is claimed is:

1. A communication system comprising a plurality of subscriber lines, a plurality of primary trunks, a plurality of primary concentrators for connecting distant groups of said subscriber lines to distinct groups of said primary trunks, a central office, a plurality of secondary trunks less in number than said primary trunks and extending from said central office, a secondary concentrator comprising means for connecting all of said primary trunks to said secondary trunks, and means at said central office responsive to initiation of a call on one of said subscriber lines for activating said connecting means in said secondary concentrator and in said primary concentrator associated with said calling line to establish a connection from said calling line to said central office.

2. A communication system comprising a central office, a plurality of lines, a plurality of primary trunks less in number than said plurality of lines, a plurality of primary concentrators remote from said central office and each comprising means for connecting an associated group of said lines to a corresponding group of said primary trunks, a plurality of secondary trunks less in number than said primary trunks and extending from said central office, a secondary concentrator remote from said central office for connecting all of said primary trunks to said secondary trunks, and means at said central office responsive to a calling condition at one of said lines for enabling said secondary concentrator and in conjunction with means at said secondary concentrator for enabling said primary concentrator associated with the group of said lines including said calling line to complete a connection of said calling line to said central office.

3. In a communication system, a plurality of lines, a central office, a plurality of primary concentrators remote from said central office, each connected to a distinct group of said lines, a secondary concentrator remote from said central office, and means for identifying a calling one of said lines to said central office through one of said primary concentrators and said secondary concentrator comprising means connected between ground at each line and a source of potential at the central office, a plurality of line identification wires, means in said primary concentrators connected between each of said associated lines and corresponding ones of said line identification wires for transferring signals over said wires indicating a change to a calling condition on the corresponding line, a plurality of line and concentrator identification leads extending from said central office, means in said secondary concentrator connected between said line identification wires from each of said primary concentrators and a corresponding one of said concentrator identification leads and means connected between a corresponding one of said line identification wires from each primary concentrator and one of said line identification leads.

4. The combination in a communication system in accordance with claim 3 and further comprising means for applying a voltage from said central office to said lines, means for applying a second voltage to said concentrator identification leads, means in said lines responsive to the initiation of a call for varying the line voltage to provide a current flow in said corresponding line identification wires and said corresponding concentrator identification lead, and first means in said central office for detecting current flow in said concentrator identification leads.

5. The combination in a communication system in accordance with claim 4 and further comprising means connected to said first current flow detection means for transferring said second voltage from said corresponding concentrator identification lead to said line identification leads and second means in said central office for detecting current flow in said line identification leads.

6. The combination in a communication system in accordance with claim 4 and further comprising means for distinguishing between simultaneous calls originated through distinct primary concentrators including said first current flow detection means comprising distinct switching means connected to each of said concentrator identification leads, means for enabling one of said switching means in response to detection of current flow in the corresponding concentrator identification lead to transfer the current flow to said line identification leads, and means for blocking enablement of all others of said switching means in response to operation of said enabling means.

7. The combination in a communication system in accordance with claim 5 and further comprising means for distinguishing between simultaneous calls originated through one of said primary concentrators including means for selectively enabling said second current flow detecting means, said enabling means comprising means for examining selected groups of said line identification leads in succession and means for inhibiting said examining means upon detection of a current flow in each of the leads in said group of line identification leads under examination.

8. The combination in a communication system in accordance with claim 7 wherein said enabling means comprises a holding circuit connected to said examining means for retaining said examining means in the position it reached prior to operation of said inhibiting means and further comprising means for releasing said holding circuit upon detection of a single call originated through said one primary concentrator.

9. A communication system comprising a plurality of lines, a central office, primary and secondary trunks of lesser number than said lines, said secondary trunks extending from said central office, a plurality of pirmary concentrators for connecting associated groups of said lines to corresponding groups of said primary trunks, a secondary concentrator remote from said central office for connecting said primary trunks to said secondary trunks, said primary and secondary concentrators comprising crosspoint means for establishing talking paths on application of marking potentials to said lines and trunks, a translator in each concentrator comprising means for applying a marking potential to the line side of said primary concentrator crosspoint means associated with a calling one of said lines, said last-mentioned means including means for varying the potentials on said calling line in one manner and on all other lines in a different manner, means for applying a marking potential to the primary trunk side of said primary and secondary concentrator crosspoint means, and means for applying a marking potential to the central office side of said secondary concentrator crosspoint means on a selected one of said secondary trunks.

10. A communication system comprising a plurality of lines, primary and secondary trunks, a plurality of primary concentrators comprising means for connecting any of a distinct group of said lines to any of a distinct group of said primary trunks, a central office, said secondary trunks extending from said central office, a secondary concentrator comprising means for connecting any of said primary trunks to any of said secondary trunks, said primary and secondary concentrators further comprising means for establishing talking paths on application of marking potentials to said lines and trunks, first translators each connected to one of said distinct groups of lines and by corresponding line identification wires to one of said distinct groups of primary trunks, first means for applying a marking potential to the primary trunk side of said primary and secondary concentrator connecting means, second means for applying a marking potential to the central office side of said secondary concentrator on a selected one of said secondary trunks and third means for applying a marking potential to the line side of a selected one of said primary concentrators, said third means comprising said first and second translators, means for varying the potentials on said line identification wires connected to one of said first translators, and means for further varying the potentials on certain of said line identification wires in accordance with the code of said one of said first translators.

11. A communication system comprising a plurality of primary crosspoint networks, a corresponding plurality of primary translators, a plurality of lines connected in distinct groups to said primary crosspoint networks and to said primary translators, a secondary crosspoint network, a secondary translator, a plurality of primary trunks connected between said primary crosspoint networks and said secondary crosspoint network and connected between said primary translators and said secondary translator, a central office, a plurality of secondary trunks extending from said central office and connected to said secondary crosspoint network and to said secondary translator, said primary and secondary crosspoint networks comprising means for defining conducting paths between said lines and said trunks on application of marking potentials thereto, means for applying a marking potential to the primary trunk side of said secondary crosspoint networks, means in said central office for selecting a secondary trunk, means for applying a marking potential to said selected secondary trunk to mark the central office side of said secondary crosspoint network, and means applying a marking potential to a calling one of said lines to mark the line side of said primary crosspoint network, said last-mentioned means comprising means for varying the voltage on certain of said primary and secondary trunks connected by one of said first translators and said second translator to said calling line.

12. A communication system comprising a plurality of lines, primary and secondary trunks, a plurality of first switching networks each comprising means for connecting any of a distinct group of said lines to any of a distinct group of said primary trunks, a central office, said secondary trunks extending from said central office, a second switching network for connecting any of said primary trunks to said secondary trunks, said first and second switching networks comprising means for establishing talking paths on application of marking potentials to said lines and trunks, first translating means connected between said lines and said primary trunks, second translator means connected between said primary trunks and said secondary trunks, first means for applying a marking potential to the primary trunk side of said second switching networks, second means including said first and second translator means for applying a marking potential to the line side of one of said plurality of first switching networks, and third means for applying a connect potential to the primary trunk side of said first switching network and to the central office side of said second switching network on a selected one of said secondary trunks.

13. A telephone system comprising a plurality of subscriber lines arranged in distinct groups, primary and secondary trunks each comprising a pair of wires, a plurality of first switching networks each arranged for connection of said subscriber lines in one of said groups to a lesser number of said primary trunks, a central office, said plurality of secondary trunks extending from said central office, a second switching network for connecting any of said primary trunks to said secondary trunks, means for establishing talking paths through said first and second switching networks on application of marking potentials to said lines and trunks, first translator means connected between said lines and a first wire of each of a plurality of said primary trunks, means for applying a marking potential to a first wire of one of said secondary trunks to mark the primary trunk side of said second switching network, means for applying a marking potential to the second wire of a selected secondary trunk to mark the central office side of said second switching network and to mark the primary trunk side of said first switching network over the second wire of a selected one of said primary trunks, and means for applying a marking potential to the line side of said first switching network, said last-mentioned means comprising said first and second translator means and means for varying the potentials applied to each of said first primary trunk wires in accordance with the code of said first translator.

14. The combination in a two-stage line concentrator system of a central office, a plurality of primary crosspoints remotely located from said central office, each of said primary crosspoints having a line side and a primary trunk side and requiring a marking potential on both sides for establishing a line-to-trunk connection, a plurality of secondary crosspoints having a primary trunk side and a secondary trunk side and requiring a marking potential on both sides for establishing a trunk-to-trunk connection, a plurality of groups of subscriber lines, a lesser number of primary trunks corresponding to each group of subscriber lines and connecting said primary crosspoints to said secondary crosspoints, a plurality of secondary trunks of lesser number than said primary trunks and connecting said secondary crosspoints to said central office, means for marking said line side of all of said primary crosspoints associated with a calling one of said subscriber lines, means for applying a potential to the primary trunk side of said secondary crosspoints for marking said secondary crosspoints, means at said central office for selecting one of said plurality of marked secondary crosspoints, means controlled by said selecting means for applying a connect potential to the secondary trunk side of said selected secondary crosspoint, and means including said selected secondary crosspoint for applying a connect potential to the primary trunk side of one of said marked primary crosspoints.

15. A telephone system comprising a plurality of telephones, a subscriber line connected to each of said telephones, a plurality of primary trunks, a first switching nework for connecting any of a group of said primary trunks to any of a group of said lines, a central office, a plurality of secondary trunks extending from said central office, a second switching network for connecting any of said primary trunks to any of said secondary trunks, and means for identifying a calling one of said telephones comprising a first translator network connected to said lines and comprising a plurality of first rectifier elements, each of said lines being connected to at least two individual first rectifier elements and all of said lines being connected to the same number of first rectifier elements, a second translator network connected between said first translator network and said central office and comprising a plurality of second rectifier elements, each of said first rectifier elements being connected to corresponding ones of said second rectifier elements, means for applying voltages from said central office to one side of said first and second rectifier elements, means for applying a voltage from said central office to said subscriber lines for normally back-biasing said first and second rectifier elements, means in said subscriber lines responsive to the initiation of a call for varying the line voltage to forward-bias the associated first and second rectifier elements, and means in said central office for detecting the current flow through said forward-biased first and second rectifier elements.

16. A telephone system in accordance with claim 15 wherein the connections between said first and second translator networks comprise said primary trunks and the connections between said second translator network and said central office comprise said secondary trunks.

17. A telephone system comprising a plurality of telephones, a subscriber line connected to each of said telephones, a plurality of primary trunks, a plurality of first switching networks for connecting any of said lines in distinct groups to any of said primary trunks in corresponding distinct groups, a central office, a plurality of secondary trunks extending from said central office, a second switching network for connecting any of said primary trunks to any of said secondary trunks, a first translator network connected to each of said distinct groups of subscriber lines comprising a plurality of first rectifier elements, each of said lines being connected to at least two individual first rectifier elements and all of said lines being connected to the same number of said first rectifier elements, a plurality of subscriber line group identification leads, a second translator network comprising a plurality of second rectifier elements connecting said first rectifier elements in each of said first translator networks to a corresponding one of said group identification leads, means for applying a first voltage from said central office to said group identification leads, means for applying a second voltage from said central office to said lines to normally back-bias said first and second rectifier elements, means for varying the resistance in a calling one of said lines to forward-bias corresponding ones of said first and second rectifier elements, and means in said central office responsive to a current flow in one of said group identification leads to identify the distinct group of subscriber lines including the calling line.

18. A telephone system in accordance with claim 17 and further comprising means for selecting one of a plurality of said groups of lines which each include a calling line, said selecting means comprising switching means connected to each of said group identification leads, means for enabling one of said switching means in response to current flow in the corresponding one of said group identification leads, means for disabling others of said switching means in response to enablement of said one switching means, and other means for removing said first voltage from said one group identification lead in response to enablement of said one switching means.

19. A telephone system in accordance with claim 18 and further comprising a plurality of subscriber line identification leads, said second translator network comprising a plurality of third rectifier elements each connecting one of said first rectifier elements in each of said first translator networks to a corresponding one of said line identification leads, means including said means for removing said first voltage from said one group identification lead for applying said first voltage to said line identification leads, and means in said central office responsive to current flow in a plurality of said line identification leads to identify the calling line.

20. A telephone system in accordance with claim 19 and further comprising means for selecting one of a plurality of calling lines from the same group of lines, said selecting means comprising means for selectively enabling said calling line identification means including means for scanning successive pluralities of said line identification leads and means for inhibiting said scanning means upon detection of current flow in each of the plurality of said line identification leads being scanned.

21. A telephone system comprising a plurality of telephones, a subscriber line associated with each of said telephones, a plurality of primary trunks, first switching means defining talking path crosspoints between groups of said lines and corresponding groups of said primary trunks, a central office, a plurality of secondary trunks extending from said central office, second switching means defining talking path crosspoints between any one of said primary trunks and any one of said secondary trunks, a plurality of first translators each connected to a corresponding group of lines, a second translator connected between said primary and secondary trunks, a plurality of rectifier elements in each of said translators, each of said lines being connected to at least three of said secondary trunks through an associated pair of said rectifier elements in said first translators, through at least two of said primary trunks and through an associated pair of said rectifier elements in said second translator, means for applying a first voltage normally to one side of said rectifier elements and a second voltage normally to the other side of said rectifier elements, the difference between said first and second voltages being sufficient to normally back-bias said rectifier elements, means for changing said second voltage sufficient to forward-bias certain of said rectifier elements comprising changing the resistance in a calling one of said lines whereby current flow in said trunks through said rectifier elements is indicative of a calling line means for inhibiting said voltages from being applied to said calling line so as to mark one side of each of said crosspoints associated with said calling line upon identification of said calling line at the central office, means for applying a marking potential to one of said secondary trunks to mark each of said secondary crosspoints, and means for applying a connect potential to a selected one of each of said primary and secondary crosspoints through a selected secondary trunk and through a corresponding primary trunk whereby a single path is determined by said crosspoints between said calling line and the central office, the difference between said marking and connect potentials being sufficient to break down said single conducting path.

22. A telephone system comprising a plurality of telephones, a subscriber line connected to each of said telephones, a plurality of primary trunks, a first switching network for connecting any of a group of said primary trunks to any of a group of said lines, a central office, a plurality of secondary trunks extending from said central office, a second switching network for connecting any of said primary trunks to any of said secondary trunks, and means for identifying a calling one of said telephones comprising a first translator network connected to said lines and comprising a plurality of first rectifier elements, each of said lines being connected to at least two individual first rectifier elements and all of said lines being connected to the same number of first rectifier elements, a second translator network connected between said first translator network and said central office and comprising a plurality of second and third rectifier elements, each of said first rectifier elements being connected to a corresponding one of said second rectifier elements and to a corresponding one of said third rectifier elements, a plurality of subscriber group identification leads extending from said central office and each connected in common to said second rectifier elements associated with a distinct one of said primary translators, a plurality of line identification leads extending from said central office and each connected in common to a distinct one of said third rectifier elements associated with each of said primary translators, means for connecting a first voltage source to said subscriber group identification leads, means for connecting a second voltage source to said lines for normally back-biasing all of said rectifier elements, means in said subscriber lines responsive to the initiation of a call for varying the second voltage in said calling line to forward-bias said rectifier elements and provide a current flow in the associated one of said subscriber group identification leads, subscriber group identification means in said central office for transferring said first voltage source from said associated subscriber group identification lead to said line identification leads, line identification means in said central office for removing said second voltage from said line identification leads associated with said calling one of said subscriber lines, and means for removing said second voltage from said subscriber lines.

23. A line concentrator trunking system in which a plurality of lines is served by a plurality of primary trunks and by a lesser plurality of secondary trunks, the lines being divided into groups each being connectable to an associated lesser number of said primary trunks, the primary trunks in turn each being connectable to the secondary trunks, means for connecting a calling one of said lines to all idle ones of said associated primary trunks, means for connecting each of said idle associated primary trunks to idle ones of said secondary trunks, a central office, said secondary trunks extending from said central office, means in said central office for selecting one of said idle secondary trunks, and means for establishing a talking path from said calling line to said central office through said selected secondary trunk.

24. In a multiple-stage line concentrator telephone system, a plurality of subscriber lines arranged in distinct groups, a primary concentrator connected to each distinct group of subscriber lines, a central office, a secondary concentrator for connecting each of said primary concentrators to said central office, a plurality of primary concentrator identification leads and line identification leads extending from said central office to said secondary concentrator, and means for distinguishing between simultaneous calls originated through distinct primary concentrators comprising distinct switching means corresponding to each of said primary concentrator identification leads and means for enabling one of said switching means in response to current flow in the corresponding one of said primary concentrator identification leads indicative of a calling line to transfer the current flow to said line identification leads and to disable all others of said switching means.

25. A multiple-stage line concentrator telephone system comprising a plurality of subscriber lines arranged in distinct groups, a primary concentrator connected to each distinct group of subscriber lines, a central office, a secondary concentrator for connecting each of said primary concentrators to said central office, a plurality of line identification leads extending from said central office to said secondary concentrator, a distinct pair of said leads being connected to one of said subscriber lines in each distinct group of lines through said primary and secondary concentrators, first means in said central office for identifying a calling one of said lines in response to current flow on the corresponding pair of said leads, and means for distinguishing between simultaneous calls originated through one of said primary concentrators comprising second means for selectively operating said first means, said second means comprising means for scanning said line identification leads in pairs and means for inhibiting said scanning means upon detecton of a current flow in each of the leads in said pair of line identification leads being scanned.

26. A multiple-stage line concentrator telephone system in accordance with claim 25 wherein said second means comprises a holding circuit connected to said scanning means for retaining said scanning means in the position it reached prior to the operation of said inhibiting means, and said first means comprises means for releasing said holding circuit upon detection of a single originating call through said one primary concentrator.

References Cited in the file of this patent

UNITED STATES PATENTS

| | | |
|---|---|---|
| 2,333,324 | Low | Nov. 2, 1943 |
| 2,820,103 | Abbott | Jan. 14, 1958 |